United States Patent
Ha et al.

(10) Patent No.: US 7,588,120 B2
(45) Date of Patent: Sep. 15, 2009

(54) ELECTRIC POWER STEERING APPARATUS USING COATED PULLEY

(75) Inventors: Dong Hun Ha, Gyeonggi-do (KR); Seong Soo Kim, Seoul (KR); Gung Joo Nam, Gangwon-do (KR)

(73) Assignee: Mando Corporation, Seoul (KR)

( * ) Notice: Subject to any disclaimer, the term of this patent is extended or adjusted under 35 U.S.C. 154(b) by 247 days.

(21) Appl. No.: 11/707,474

(22) Filed: Feb. 15, 2007

(65) Prior Publication Data

US 2007/0221439 A1    Sep. 27, 2007

(30) Foreign Application Priority Data

Feb. 24, 2006    (KR) .................. 10-2006-0018332

(51) Int. Cl.
*B62D 5/04* (2006.01)
(52) U.S. Cl. .................. 180/444; 427/384; 427/385.5
(58) Field of Classification Search .................. 180/444; 427/372.2, 384, 385.5; 474/74
See application file for complete search history.

(56) References Cited

U.S. PATENT DOCUMENTS

| | | | |
|---|---|---|---|
| 5,598,913 A | * | 2/1997 | Monahan et al. ........... 192/41 S |
| 7,052,420 B2 | * | 5/2006 | King et al. .................. 474/74 |
| 2003/0192734 A1 | | 10/2003 | Bugosh |
| 2004/0092346 A1 | | 5/2004 | King et al. |

FOREIGN PATENT DOCUMENTS

| | | | |
|---|---|---|---|
| CN | 1508236 A | * | 6/2004 |
| EP | 1217260 A1 | | 6/2002 |
| JP | 10-297508 A | | 11/1998 |
| JP | 2004-136720 A | | 5/2004 |

* cited by examiner

*Primary Examiner*—Tony H. Winner
(74) *Attorney, Agent, or Firm*—Seed IP Law Group PLLC

(57) ABSTRACT

An electric power steering apparatus includes a pinion shaft coupled to a steering wheel shaft, a rack shaft coupled to the pinion shaft and having a ball screw, a ball nut provided in the ball screw through a plurality of balls, a first pulley coupled to the ball nut, a torque sensor sensing steering wheel torque, an electric motor for generating a steering assisting force according to the torque sensor signal, a second pulley at one end of the electric motor, and a belt connecting the first pulley to the second pulley to transmit the steering assisting force to the ball nut. The first or second pulley have a coating including 10 to 90 wt % molybdenum sulfide, 5 to 10 wt % antimony trioxide, 1 to 5 wt % antirust agent, 1 to 5 wt % auxiliary lubricant, and 1 to 3 wt % organic adhesive in a 1 to 10 wt % solvent.

2 Claims, 4 Drawing Sheets

ELECTRIC POWER STEERING APPARATUS USING COATED PULLEY

BACKGROUND OF THE INVENTION

1. Field of the Invention

The present invention relates to an electric power steering apparatus using a coated pulley.

2. Description of the Related Art

In a steering system of a vehicle, a so-called power steering apparatus for assisting steering operation using an external power source has been widely employed. Conventionally, a vane type hydraulic pump has been used as the power source for the power steering apparatus, so that this hydraulic pump is mainly driven by the engine. However, this type of power steering apparatus has a large power loss (e.g., several to several tens horsepower at a maximum load) of the engine because of driving the hydraulic pump at all times, so that it is hard to apply the power steering apparatus to a light weight and small engine displacement vehicles. Even a comparatively large engine displacement vehicle comes to have the inevitable demerit that its fuel consumption rate is lowered enough not to be negligible.

Accordingly, in order to solve the problems, an electric power steering (EPS) apparatus utilizing an electric motor as a power source has attracted the attention over the recent years. Since the electric power steering apparatus uses a battery mounted in the vehicle as a power source for the electric motor, there is no direct drive loss of the engine. In addition, the electric motor is started only when assisting the steering operation, so that the decrease in the fuel consumption rate is restrained and the electronic control can be extremely easily performed.

In the meantime, as a steering gear for a passenger car, a rack-and-pinion type steering gear is mainly employed recently, since the rack-and-pinion type gear has high rigidity performance and is low in weight. As the electric power steering apparatuses for the rack-and-pinion steering gear, there are provided a column assist type in which the electric motor is installed to a side of a column to drive a steering shaft or a pinion itself, or a ball screw rack assist type in which a rack shaft is driven by an electrically-driven ball screw mechanism. In the ball screw rack assist type electric power steering apparatus, the assist force is not exerted on an engaging surface between the pinion and the rack, so that a contact surface pressure between both the members, which causes abrasion and deformation, is relatively small.

FIG. 1 is a perspective view showing an electric power steering apparatus according to a prior art.

Referring to FIG. 1, a steering column 1 serves to rotatably support an upper pinion shaft 3. A steering wheel 5 is mounted to an upper end of the upper pinion shaft 3, and a lower pinion shaft 9 is coupled to a lower end of the upper pinion shaft 3 through a universal joint 7. A steering gear 11 including a rack-and-pinion mechanism or a power assist mechanism is connected to a lower end of the lower pinion shaft 9.

As shown in the figure, a column cover 13 is provided to cover the steering column 1. Also, tie rods 15 are connected to right and left ends of the steering gear 11.

FIG. 2 is a longitudinal sectional view of an electric power steering gear according to the prior art.

Referring to FIG. 2, a rack-and-pinion housing 21 keeps a rack shaft 23 and a pinion (not shown) of the rack-and-pinion mechanism to be accommodated therein. In the rack shaft 23, a rack 25 meshed with the pinion is provided in the left side of the power steering gear 11. In addition, spherical joints 27 supporting hingedly the tie rods 15 are fixed to the right and left ends of the power steering gear 11.

A belt housing 31 bolted to a right end of the rack-and-pinion housing 21 and a ball screw housing 33 bolted to the belt housing 31 and defining an electric steering gear case together with the rack-and-pinion housing 21 and the belt housing 31, define an outer shell of the power assist mechanism.

An electric motor 35 is attached to a lower side of the belt housing 31, and the gear housing 31 has a power transmission mechanism accommodated therein, i.e., a driving pulley 37 fixed to a shaft 36 of the electric motor 35, a hollow driven pulley 39 coupled to a ball nut 51 and a belt 41 wound on the driving pulley 37 and the driven pulley 39.

In the ball screw housing 33, the ball nut 51 is maintained to be rotatable through a double-row angular ball bearing 53.

Also, the rack shaft 23 is formed with a male thread groove in the shape of a ball screw, while the ball nut 51 is formed with a female thread groove in the shape of a ball screw. A plurality of steel balls 65, as circulation balls, are interposed between the male thread groove and the female thread groove. Moreover, the ball nut 51 is mounted with a circulation piece (not shown) for causing the steel balls 65 to circulate.

In addition, a female spline is formed in an end of the driven pulley 39 corresponding to the ball nut 51, while a male spline engaged with the female spline is formed on the ball nut 51. Accordingly, the driven pulley 39 and the ball nut 51 are integrally rotated with assembled.

The operation of the electric power steering apparatus will be described with reference to FIG. 1 and FIG. 2 as follows.

Once a driver turns the steering wheel 5, the rotational force thereof is transferred to the steering gear 11 via the upper steering shaft 3 and the lower steering shaft 9. Since the steering gear 11 includes therein the rack-and-pinion mechanism for converting a rotational motion into a rectilinear motion, the rack shaft 23 moves in any one of the right and left directions. Therefore, a steering angle of road wheels is changed through the right and left tie rods 15, and thus, the steering operation is performed.

Simultaneously, in the power assist mechanism, the electric motor 35 rotates at a predetermined rotational torque in a forward or reverse direction based on an output of a steering torque sensor (not shown). The rotation of the electric motor is reduced and transferred to the ball nut 51 via the driving pulley 37 and the driven pulley 39. The ball nut 51 is spline-coupled to and cooperated with the driven pulley 39. When the ball nut 51 is rotated, a thrust force is exerted on the male thread groove of the rack shaft 23 through the steel balls 65 provided in the female thread groove, so that a steering assist operation is performed.

In the operation of the electric motor, the driving and driven pulleys 37 and 39 are in surface contact with the belt 41 to make the belt rotate in the caterpillar manner. It is true that the driving and driven pulleys 37 and 39 are continuously in surface contact with a surface of the belt 41, thus wearing and being damaged. Also, the driving and driven pulleys 37 and 39 can be manufactured by machining general carbon steel having a relatively good processability. Due to the excellent processability, the general carbon steel has been used widely for manufacturing mechanical parts requiring a dimensional precision.

However, in the parts such as the driving pulley and the driven pulley employed in the electric power steering apparatus according to the prior art, since a gap between teeth thereof is small, it is difficult to lower a surface roughness of the pulleys to a certain level when the pulleys are manufactured by machining general carbon steel. Consequently, due to the above problem, the belt that is a counterpart of the driving and driven pulleys wears, so that the durability of the belt can be reduced. In particular, due to hardening of the surface of the belt in the early stage of operation of the apparatus at a low temperature, there is a problem in that an abnormal friction is generated between the surfaces of the pulley and the belt, thus generating a noise and slip phenomenon.

SUMMARY OF THE INVENTION

In one embodiment, the present invention provides an electric power steering apparatus using a coated pulley which is capable of being stably used for a long period and has excellent abrasion resistance and friction resistance properties by coating a pulley with a coating layer which is composed at a certain composition ratio.

According to an aspect of the present invention, there is provided an electric power steering apparatus using a coated pulley, comprising a pinion shaft coupled to a shaft of a steering wheel and having teeth formed on the pinion shaft; a rack shaft having teeth formed in one end thereof and a ball screw formed in the other end thereof, the teeth of the rack shaft being meshed with the teeth of the pinion shaft; a ball nut provided on the ball screw through a plurality of balls interposed between the ball nut and the ball screw; a first pulley coupled to the ball nut to cooperate therewith; a torque sensor for sensing a torque generated from the steering wheel; an electric motor for generating a steering assisting force according to a signal from the torque sensor; a second pulley installed to one end of the electric motor; and a belt connecting the first pulley and the second pulley to each other to transmit the steering assisting force generated from the electric motor to the ball nut, wherein the first or second pulley has a coating layer formed on an outer surface thereof.

According to a preferred embodiment, the coating layer has a composition ratio of molybdenum sulfide of 10 to 90 wt %, antimony trioxide of 5 to 10 wt %, antirust agent of 1 to 5 wt %, auxiliary lubricant of 1 to 5 wt % and organic adhesive of 1 to 3 wt % dispersed in a solvent of 1 to 10 wt %. In addition, the coating layer is subjected to cleaning, coating, drying and curing processes and has a thickness of 1 to 100 μm.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE PREFERRED EMBODIMENT

Figure 1:
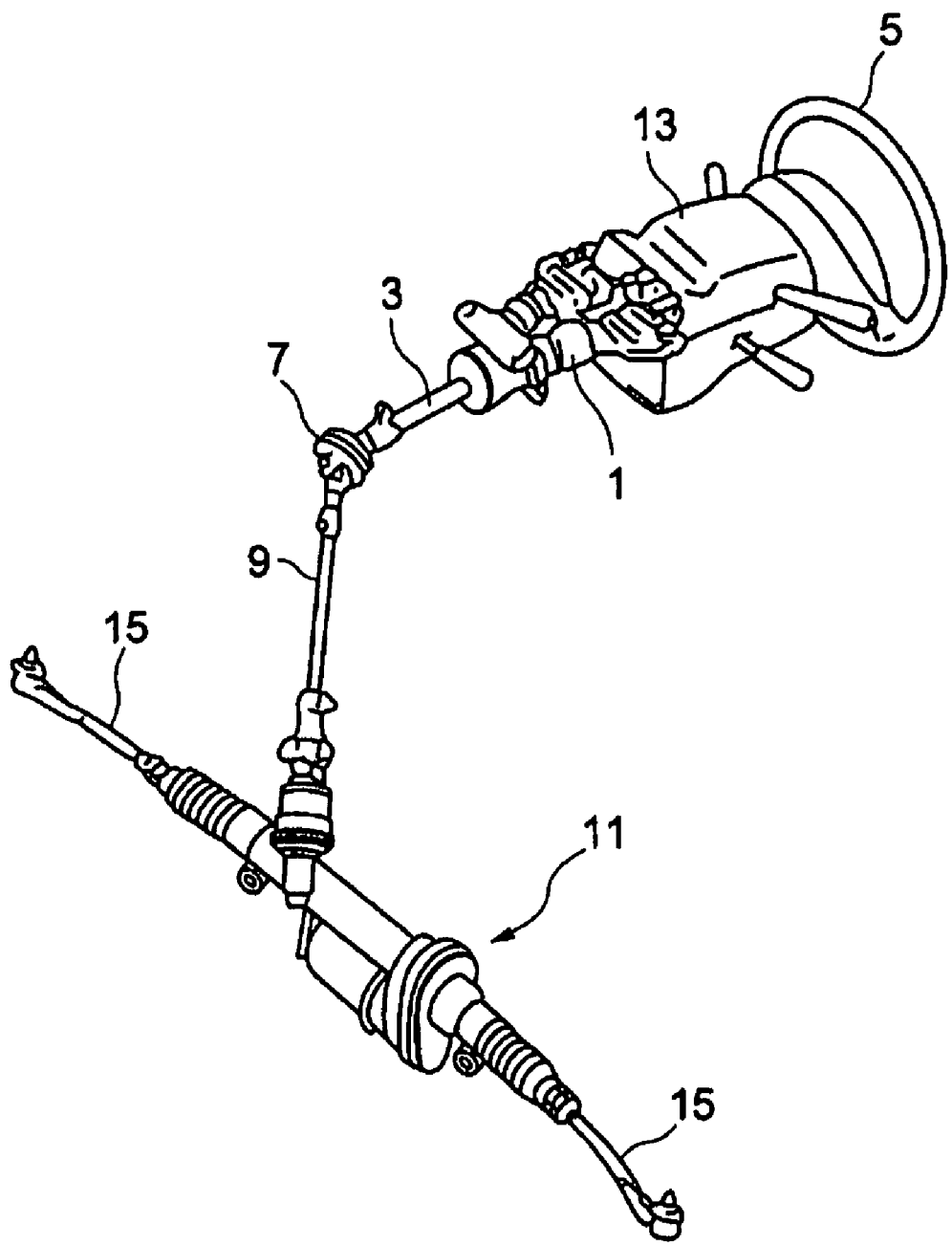
FIG. 1 is a perspective view showing an electric power steering apparatus according to a prior art.
Figure 2:
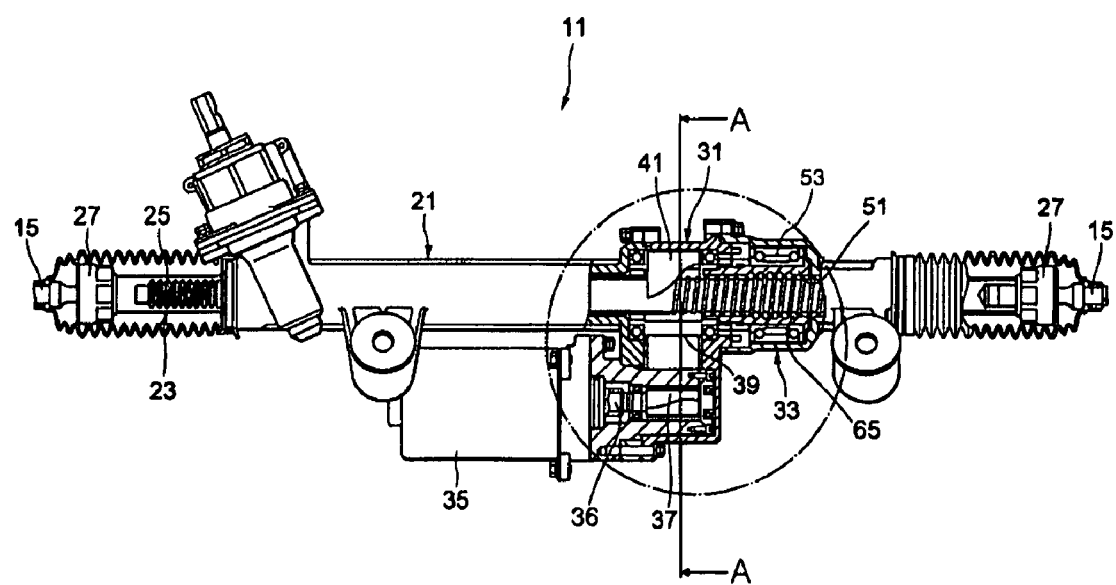
FIG. 2 is a longitudinal sectional view of an electric power steering gear according to the prior art.
Figure 3:
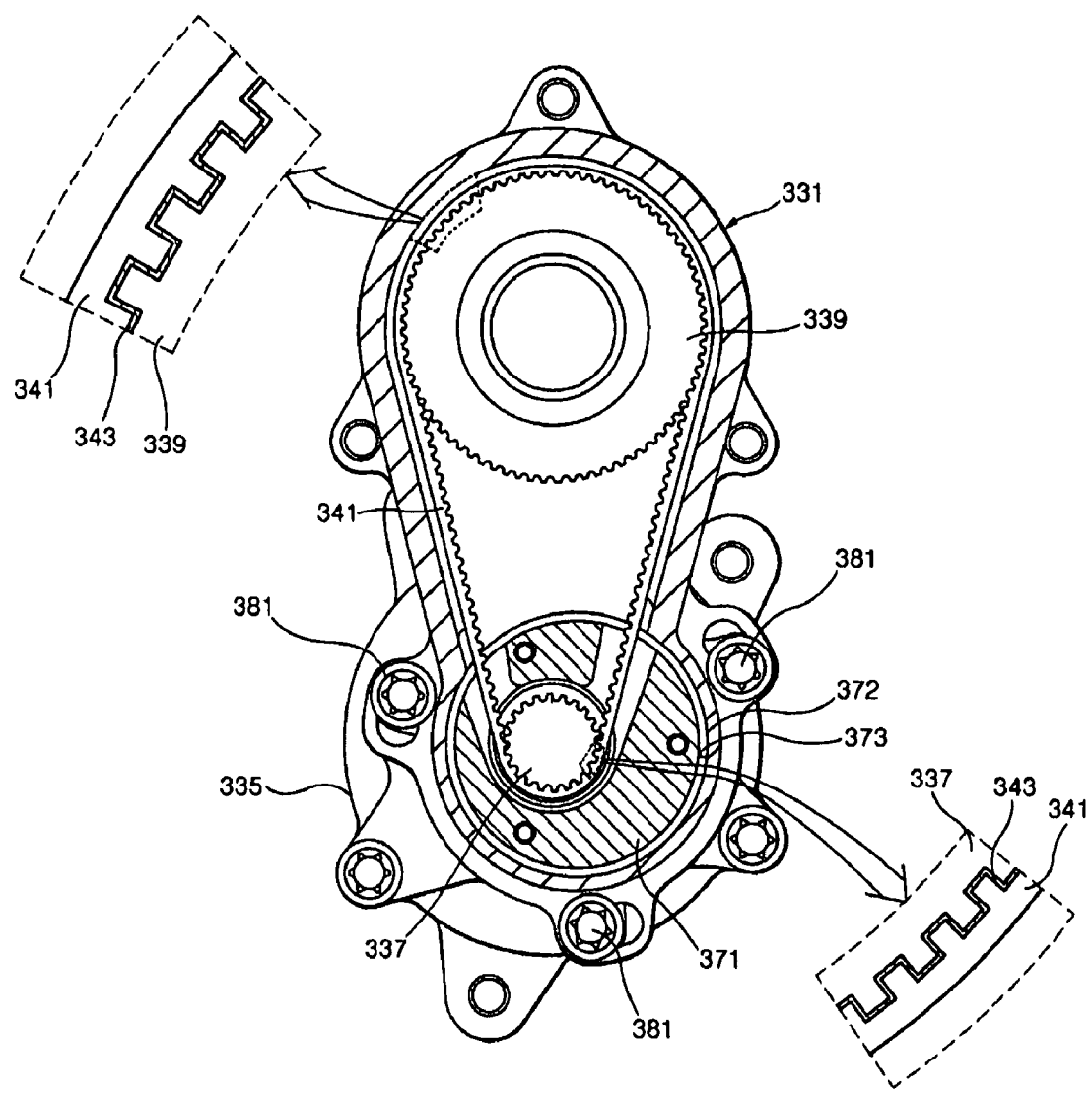
FIG. 3 is a sectional view corresponding to a cross section taken along line A-A of FIG. 2 for illustrating an electric power steering gear including pulleys according to a preferred embodiment of the present invention.

Hereinafter, a preferred embodiment of the present invention will be described in detail with reference to the accompanying drawings FIG. 3 is a sectional view corresponding to a cross section taken along line A-A of FIG. 2 for illustrating an electric power steering gear including pulleys according to a preferred embodiment of the present invention.

First, a generally cylindrical motor flange 371 is fastened to an end of an electric motor 335 with three bolts 381, and a fitting portion 372 of the motor flange 371 is fitted into a motor supporting hole 373 formed in a rack-and-pinion housing 331. The electric motor 335 can generate a steering assisting force according to a signal transmitted from a steering torque sensor (not shown) which senses a torque generated at a steering wheel of a vehicle. Then, a driving pulley 337 installed to an end of the electric motor 335 can transmit the steering assisting force of the electric motor 335 through a belt 341 to a driven pulley 339 coupled to a ball nut to cooperate therewith.

Here, the driving or driven pulley 337 or 339 comprises a coating layer 343 according to the present invention, which is formed of a coating liquid prepared by dispersing molybdenum sulfide ($MoS_2$) as a main component, antimony trioxide ($Sb_2O_3$), antirust agent, auxiliary lubricant and organic adhesive into a solvent. The coating layer 343 may be formed of a coating liquid prepared by dispersing molybdenum sulfide of 10 to 90 wt %, antimony trioxide of 5 to 10 wt %, antirust agent of 1 to 5 wt %, auxiliary lubricant of 1 to 5 wt % and organic adhesive of 1 to 3 wt % into the solvent of 1 to 10 wt %.

The coating layer 343 formed on an outer surface of the driving or driven pulley 337 or 339 is characterized in that the coating layer is formed to have a thickness of 1 to 100 μm through cleaning, coating, drying and curing processes according to the present invention. Here, the coating layer of 1 to 100 μm in thickness can decrease a clearance which can be generated between the driving or driven pulley 337 or 339 and the belt 341 thus providing lubricating effect of the belt 342.

In addition, when the driving or driven pulley 337 or 339 is engaged with the belt 341 for transmitting the steering assisting force and used for a long or short period, the coating layer 343 can prevent the wear of the belt 341 caused by a high roughness of the surface of the driving or driven pulley 337 or 339 and thus provide the lubricating effect of the belt 342.

Accordingly, since the coating layer 343 according to the present invention is formed, the driving or driven pulley 337 or 339 of the electric power steering gear can have the excellent wear and friction resistance properties when the operation is performed under high load and speed conditions with the pulley in surface contact with the belt 341. Also, when the driving or driven pulley 337 or 339 on which the coating layer 343 is formed is engaged with the belt 341 and operated at low temperature, the driving or driven pulley considerably lowers a noise and slip phenomenon caused by surface hardening of the belt 341, thereby causing the electric power steering gear to stably operate.

Figure 4:
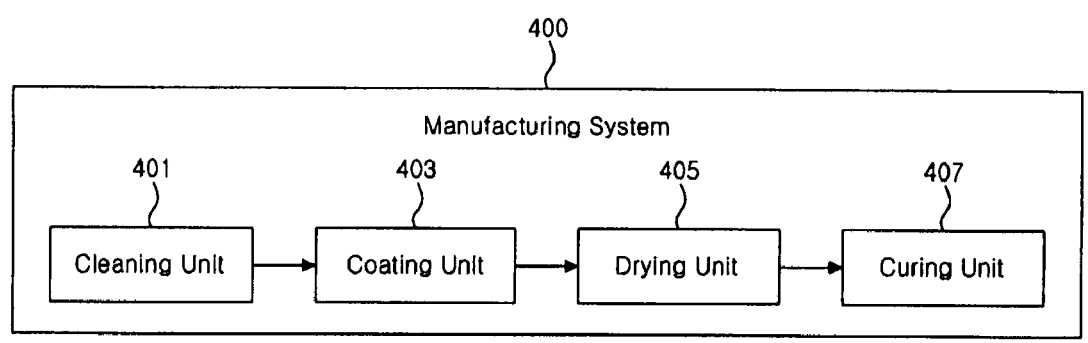
FIG. 4 is a block diagram for illustrating a manufacturing process of a driving or driven pulley having a coating layer formed thereon according to the preferred embodiment of the present invention.

FIG. 4 is a block diagram for illustrating a manufacturing process of a driving or driven pulley having a coating layer formed thereon according to the preferred embodiment of the present invention.

Referring to FIG. 4, a manufacturing system 400 for manufacturing a driving or driven pulley having the coating layer formed thereon according to the present invention comprises a cleaning unit 401, a coating unit 403, a drying unit 405 and a curing unit 407.

In order to manufacture the driving or driven pulley 337 or 339 on which the coating layer 343 according to the present invention is formed, a conventional ultrasonic cleaning process for the driving or driven pulley is first performed in the cleaning unit 401. In the ultrasonic cleaning process, the pulley is immersed in cleaning liquid and cleaned by ultrasonic wave in a vacuum state.

Hereafter, the driving or driven pulley cleaned through the cleaning unit 401 is delivered to the coating unit 403 for forming the coating layer according to the present invention, and may be coated by a spray or dip coating method. Here, as illustrated in the description regarding FIG. 3, the chemical components of the coating liquid for the coating layer are molybdenum sulfide ($MoS_2$) as a main component, antimony trioxide ($Sb_2O_3$), antirust agent, auxiliary lubricant and organic adhesive dispersed in a solvent at a certain composition ratio.

The driving or driven pulley coated through the coating unit 403 is dried in the conventional drying unit 405 for 10 to 180 minutes. Hereafter, the driving or driven pulley dried through the drying unit 405 is cured at a temperature of 10~180° through the curing unit 40. Accordingly, the driving or driven pulley on which the coating layer according to the present invention is formed can be manufactured.

According to the present invention, using the coating layer formed of a coating liquid prepared at a certain composition ratio which is formed on the pulley, there is provided the electric power steering apparatus using the coated pulley, which has excellent abrasion and friction resistance properties and is stably used for a long time.

The foregoing descriptions are merely for illustration of the preferred embodiment of the present invention. It will be apparent that those skilled in the art can make various modifications and changes thereto without change the spirit of the invention.

What is claimed is:

1. An electric power steering apparatus using a coated pulley, comprising:
    a pinion shaft coupled to a shaft of a steering wheel and having teeth formed on the pinion shaft;
    a rack shaft having teeth formed in one end thereof and a ball screw formed in the other end thereof, the teeth of the rack shaft being meshed with the teeth of the pinion shaft;
    a ball nut provided on the ball screw through a plurality of balls interposed between the ball nut and the ball screw;
    a first pulley coupled to the ball nut to cooperate therewith;
    a torque sensor for sensing a torque generated from the steering wheel;
    an electric motor for generating a steering assisting force according to a signal from the torque sensor;
    a second pulley installed to one end of the electric motor;
    a belt connecting the first pulley and the second pulley to each other to transmit the steering assisting force generated from the electric motor to the ball nut; and
    a coating layer formed on an outer surface of the first or second pulley, the coating layer having a composition ratio of molybdenum sulfide of 10 to 90 wt %, antimony trioxide of 5 to 10 wt %, antirust agent of 1 to 5 wt %, auxiliary lubricant of 1 to 5 wt % and organic adhesive of 1 to 3 wt % dispersed in a solvent of 1 to 10 wt %.

2. The electric power steering apparatus as claimed in claim 1 wherein the coating layer is subjected to cleaning, coating, drying and curing processes and has a thickness of 1 to 100 μm.

* * * * *